US012606495B2

(12) United States Patent
Wat et al.

(10) Patent No.: US 12,606,495 B2
(45) Date of Patent: Apr. 21, 2026

(54) COMPLIANT SUTURE-BASED JOINERY

(71) Applicant: LAWRENCE LIVERMORE NATIONAL SECURITY, LLC, Livermore, CA (US)

(72) Inventors: Amy Wat, Oakland, CA (US); Gabriella King, Livermore, CA (US); James Cahill, Livermore, CA (US); Joshua Kuntz, Livermore, CA (US); Wyatt Du Frane, Livermore, CA (US); Marcus Worsley, Hayward, CA (US); Logan Bekker, Pleasanton, CA (US); Xiaojie Xu, Castro Valley, CA (US); Yici Sun, Atlanta, GA (US); Joshua Deotte, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 701 days.

(21) Appl. No.: 17/392,686

(22) Filed: Aug. 3, 2021

(65) Prior Publication Data

US 2023/0037628 A1 Feb. 9, 2023

(51) Int. Cl.
| | |
|---|---|
| *C04B 37/00* | (2006.01) |
| *B28B 1/00* | (2006.01) |
| *B33Y 80/00* | (2015.01) |

(52) U.S. Cl.
CPC ............ *C04B 37/003* (2013.01); *B28B 1/001* (2013.01); *C04B 37/008* (2013.01); *B33Y 80/00* (2014.12); *C04B 2237/125* (2013.01); *C04B 2237/365* (2013.01); *C04B 2237/64* (2013.01); *C04B 2237/72* (2013.01)

(58) Field of Classification Search
None
See application file for complete search history.

(56) References Cited

U.S. PATENT DOCUMENTS

| | | | | |
|---|---|---|---|---|
| 6,406,636 | B1 * | 6/2002 | Vaganov | ............ H01L 21/2007 216/36 |
| 2007/0194085 | A1 * | 8/2007 | Spinella | ............... C04B 37/006 228/101 |

FOREIGN PATENT DOCUMENTS

WO WO-2018139209 A1 * 8/2018 ............... C03C 8/24

* cited by examiner

*Primary Examiner* — Yung-Sheng M Tsui
(74) *Attorney, Agent, or Firm* — Zilka-Kotab, P.C.

(57) ABSTRACT

Methods of forming joinery between components formed from dissimilar materials, and assemblies utilizing the joinery. The components include interface surfaces having complementary peaks and valleys that interlock. A compliant interface is formed between the interface surfaces and the interface can be configured to provide functionality.

21 Claims, 8 Drawing Sheets

650

Method of Forming an Assembly

652 — Providing a First Component

654 — Providing a Second Component

656 — Forming Interface by Flowing Interface Material

End

Detail B     1362     1360

1362     1360

COMPLIANT SUTURE-BASED JOINERY

This invention was made with Government support under Contract No. DE-AC52-07NA27344 awarded by the United States Department of Energy. The Government has certain rights in the invention.

FIELD OF THE INVENTION

The present invention relates to methods and joinery configurations for coupling components and more particularly to suture-based joinery for coupling components formed from dissimilar materials, and parts and methods utilizing the same.

BACKGROUND

The continued development of manufacturing techniques for structures utilizing dissimilar materials, such as those including an ultra-high temperature ceramic (UHTC), is necessary for advancements in many different applications. For example, applications of ultra-high temperature ceramics are often found in the fields of aerospace, transportation, and energy production; and often include applications that provide thermal stability and protection for components and/or surfaces. Because of UHTC's high strength and capability to withstand extreme environments UHTCs are an ideal material for applications that are exposed to extreme environments and temperatures, such as environments that have temperatures that reach above 1000° C. UHTC also exhibit high melting temperatures, high hardness, thermal shock resistance, and good chemical and thermal stability. Their application has often been limited by issues in integrating UHTCs in systems built with dissimilar materials, such as systems that utilize a UHTC coupled to a metal. In particular, some applications result in the UHTCs being susceptible to catastrophic failure and often require costly manufacturing techniques to join the UHTC to a dissimilar material.

Current methods in the field uses either mechanical fixtures or brazing. Mechanical fixtures can include screws, pins and clamps, such as mechanical fasteners traditionally used to connect different components together. Other mechanical fixtures can rely on high precision machining to provide precise fit between components. The manufacturing techniques used to create mechanical fixtures were often designed for metals and softer ceramics and can be prohibitively costly to use for UHTCs due to their high hardness. Mechanical fixtures can allow for different thermal expansions of coupled materials, simple disassembly and reassembly, and easy inspection. However, UHTCs combined with mechanical fixtures can be susceptible to defects introduced during manufacturing and assembly which can lead to the UHTC components to fail catastrophically during operation because of the low fracture toughness found in UHTCs. For example, threaded bores in UHTCs can form cracks during manufacturing or assembly. Additionally, mechanical fixtures tend to be bulky and can add stress concentrators within the ceramic phase, resulting in catastrophic failure. Therefore, mechanical fixtures are not ideally suited for joining UHTCs.

In brazing, a chemical reaction is used to bond the materials together at the interface. Brazing can be used to form a chemical bond between metals and ceramics to form a junction and involve creating a layered interface between the components to form a mechanical junction. It often utilizes a metal that can react with the surface of the ceramic to form a bond, another material that can form a bond with the other side of the junction, and a refractory metal interposed that is configured to increase the melting temperature of the junction. This method is generally lighter and more portable than using a mechanical fixture. Additionally, certain brazing materials can act as a filler for any surface flaws introduced during machining of parts. Brazing can also avoid features that form stress concentrations in part design. However, brazing often introduces a brittle intermetallic phase that is susceptible to failure due to residual stresses and it is more difficult to inspect the quality of the brazed joint after it is formed, compared to inspecting mechanical fixtures. Furthermore, the materials used in a brazed joint are limited by the thermal expansion coefficients of each component and a mismatch in thermal expansion coefficients can introduce new flaws at the junction of the system. Accordingly, brazing can lead to thick, brittle reaction layers and can cause premature failure due to residual stresses.

A joinery configuration should avoid creating a stress concentrator. Thus, it would be desirable to create a joinery configuration that provides a reliable strong coupling between components formed from dissimilar materials.

SUMMARY

A suture-based joinery configuration for coupling components is described. The joinery can be used to effectively couple components formed from dissimilar materials, including components constructed from materials having different hardness. The joinery can include an interface material and mechanical interlocking to provide a robust joint.

A method of joining components, according to an embodiment, includes providing a first component, providing a second component, and forming a compliant interface. The first component defines a first interface surface formed with peaks and valleys. The second component defines a second interface surface that is configured to complement the first interface surface. The compliant interface is formed from an interface material interposed between the first interface surface of the first component and the second interface surface of the second component.

A method of joining components, according to another embodiment, includes providing a first component, providing a second component, and forming a compliant interface. The first component is constructed from a ceramic material and defines a first interface surface formed with peaks and valleys. The second component defines a second interface surface formed with peaks and valleys that are configured to complement and interlock with the peaks and valleys of the first interface surface. The compliant interface is formed from an interface material interposed between the first interface surface of the first component and the second interface surface of the second component. The compliant interface is configured to provide at least one of an optical and electrical output in response to stress applied to the compliant interface.

An assembly, according to an embodiment, includes a first component, a second component, and an interface. The first component includes a first interface surface defined by a plurality of first locking structures that form peaks and valleys. The second component includes a second interface surface defined by a plurality of second locking structures that form peaks and valleys. The first component is constructed of a first material and the second component is constructed of a second material. The second locking structures complement and interlock with the first locking structures. One of the first material and the second material is more brittle than the other of the first material and the second material. The interface is interposed between the first interface surface of the first component and the second interface surface of the second component. The interface is constructed of an interface material, and the interface material has a stiffness lower than a stiffness of the first material and a stiffness of the second material.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

I. Introduction

Figure 1:
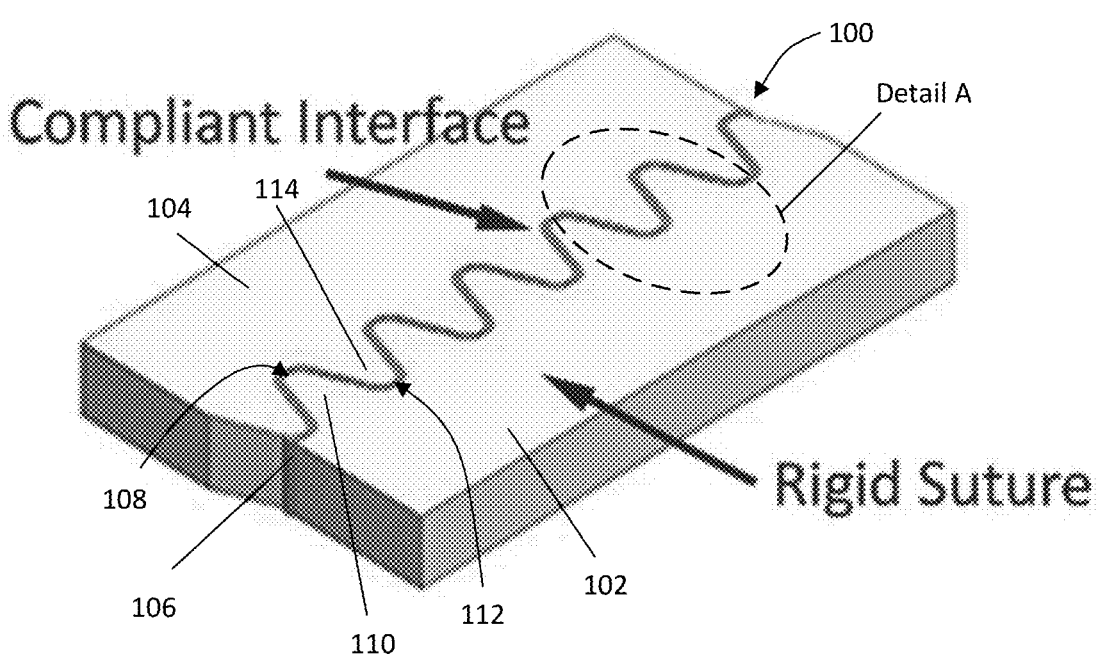
FIG. 1 is a perspective view of a joint configuration in accordance with an embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the"

include plural referents unless otherwise specified. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

II. Example Embodiments

The following description discloses several structures that include suture-based joinery configuration for coupling components formed from dissimilar materials. The concepts described herein provide joinery that provides a mechanically robust method of joining components without being required to use large fixtures and without being formed by processes that could introduce new flaws through machining. The concepts combine mechanical interlocking with chemical bonding to reduce the impact of any behaviors that can arise, such as solidification behavior, in an interface material. The mechanical interlocking is provided between components by the suture-based configuration that is formed by complementary tortuous surfaces that at least partially mechanically interlock. The tortuous surfaces result from surface undulations or features forming peaks and valleys. The chemical bonding is provided by an interface formed with an interface material that provides chemical reactivity with the adjacent components. In particular, the chemical reactivity allows for chemical bonding between the material of the components and the interface material, and the mechanical interlocking structures are configured to limit relative motion between the components and failure of the components.

The joinery configuration described herein, can include a compliant interface material having a lower stiffness than the adjacent components that is interposed between components constructed of dissimilar materials. It should be appreciated that the lower stiffness can be a result of environmental or loading conditions on the interface, such as in high-temperature applications. The interface material can be configured to provide functionality, such as by generating an output signal. The interface material can be configured to generate an output signal that corresponds to a physical or chemical condition of the joint.

The joinery configuration minimizes flaws introduced by brazing by using hierarchical locking structures that utilize mechanical interference to increase the robustness of the joinery. The concepts include configurations that can be manufactured avoiding the need for high machining precision by using advanced manufacturing techniques, such casting, printing, and infiltration.

Figure 2:
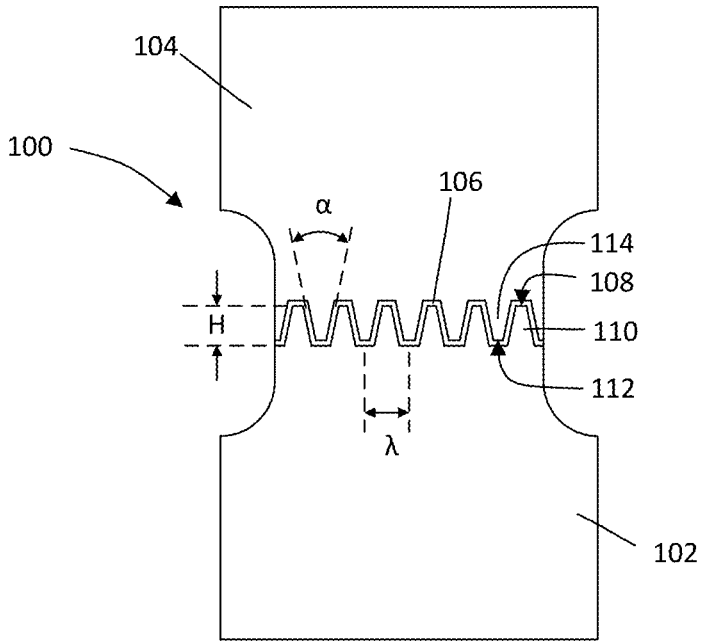
FIG. 2 is a top view of the joint configuration of FIG. 1.
Figure 3:
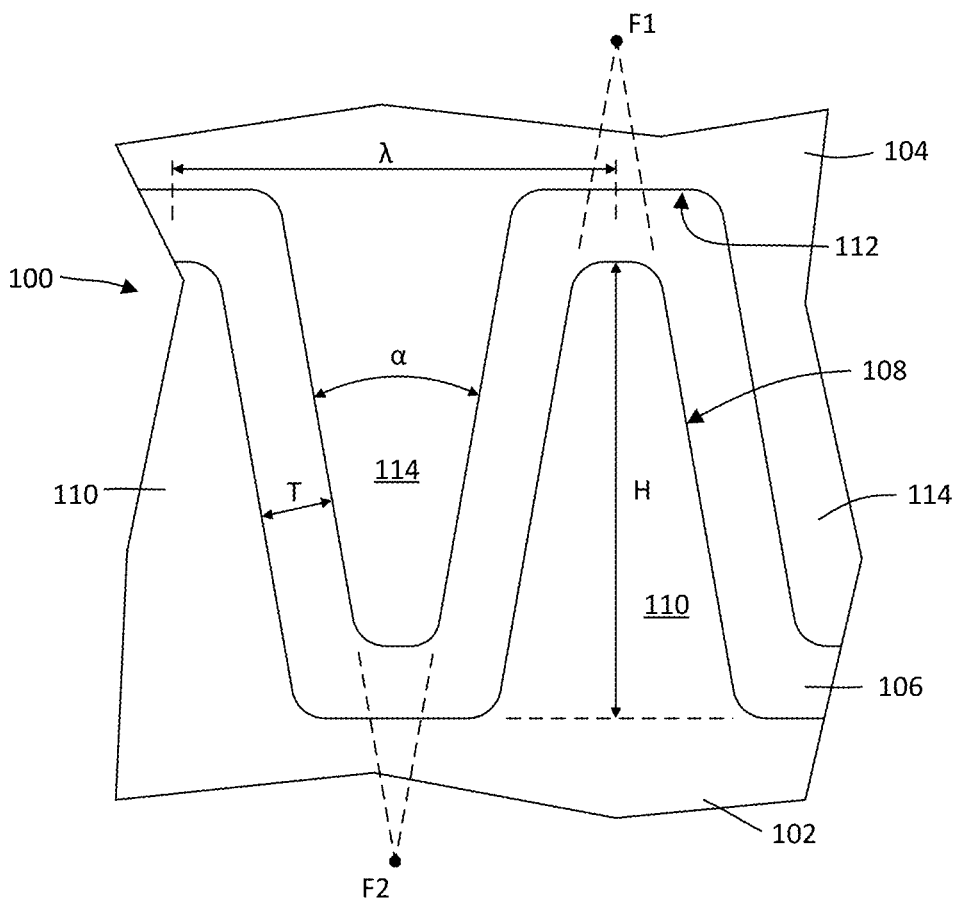
FIG. 3 is a top view of a portion of the joint configuration, corresponding to Detail A of FIG. 1.

Referring to FIGS. 1-3, an exemplary joinery configuration for coupling components, especially components formed from dissimilar materials, is shown. The joinery configuration of joint 100 is generally formed by a first component 102, a second component 104, and an interface 106. The first component 102 is a body formed from a first material and defines an interface surface 108. The interface surface 108 is a non-planar contoured surface of the first component 102. The contour of the interface surface 108 is formed by a plurality of locking structures 110, such as projections, that form peaks and valleys in the interface surface 108.

The locking structures 110 can have the same shape over the first component 102 so that the interface surface 108 has a repeated contour shape. Alternatively, the locking structures 110 can have a variety of shapes, sizes, and/or spacing so that different portions of the interface surface 108 have different contour shapes. In the illustrated example, the locking structures 110 have the same shape over the first component 102. In particular, the interface surface 108 has a generally undulating or wavy configuration created by locking structures 110 formed by a plurality of tapered side walls interconnected by a plurality of parallel walls so that each locking structure 110 is formed with a trapezoidal cross-sectional shape. As shown, locking structures 110 have a common shape and are equally spaced across the first component 102. It should be appreciated that the locking features can be sized to correspond with the size of the component such as by incorporating larger locking structures on larger components, or relatively smaller locking structures on smaller components.

The second component 104 is a body formed from a second material and defines an interface surface 112. The interface surface 112 is a non-planar contoured surface and the contour is formed by a plurality of locking structures 114 that form peaks and valleys in the interface surface 112. The locking structures 114 of the illustrated embodiment have tapered side walls and are generally formed as ridges having a trapezoidal cross-sectional shape that narrows as the locking structure extends further away from the second component. The locking structures 114 of the second component 104 are shaped and sized to complement the locking structures 110 of the first component 102.

The locking structures 114 can have the same shape over the second component 104 so that the interface surface 112 has a repeated contour shape. Alternatively, the locking structures 114 can have a variety of shapes, sizes, and/or spacing so that different portions of the interface surface 112 have different contour shapes. In the illustrated example, the locking structures 114 have the same shape over the second component 104. In particular, the interface surface 112 has a generally undulating configuration created by locking structures 114 formed by a plurality of tapered side walls interconnected by a plurality of parallel walls so that each locking structure 114 is formed with a trapezoidal cross-sectional shape. As shown, locking structures 114 have a common shape and are equally spaced across the second component 104.

The locking structures 114 of the second component 104 are shaped to complement the locking structures 110 of the first component 102 so that when the first component 102 is combined with the second component 104 the locking structures interlock. In particular, the size, shape, and spacing of locking structures 114 are selected so that peaks of interface surface 108 fit within valleys of interface surface 112. In the illustrated example, the locking structures 110 of the first component 102 and the locking structures 114 of the second component 104 have the same size, shape, and spacing but are offset so that they are positioned to interlock when the first component 102 and the second component 104 are coupled.

The shape and size of the interlocking structures are selected to provide mechanical interference to limit relative motion, such as relative sliding, between the first component 102 and the second component 104. By limiting that relative motion, failures originating from friction between the first component 102 and the second component 104 can be prevented. The locking structures 110, 114 can be formed at a wide range of dimensional scales. For example, the locking structures 110, 114 can be formed with dimensions in micrometer, millimeter, and/or centimeter ranges and the dimensions can be selected based on a desired stiffness and toughness of the resulting joint.

The tapered side walls are generally formed to have an internal angle $\alpha$ defined by axes tangent to opposite side walls. In the example illustrated in FIG. 3, the locking structures are configured so that those axes converge to a focal point F that is spaced from the respective component, i.e., focal point F1 is spaced from the first component 102 and focal point F2 is spaced from the second component 104. The internal angle $\alpha$ can be in a range between about 10° and about 170°. In at least some embodiments, the internal angle $\alpha$ is in a range between about 10° and about 40°. In at least some embodiments, the internal angle $\alpha$ is in a range between about 20° and about 30°. In at least one embodiment the internal angle $\alpha$ is about 22.6°. In other examples, the locking structures can have an undercut configuration in which the focal point can be positioned within the respective component as will be described in greater detail below.

Additional characteristics of the locking structures can be used to alter the interlocking configuration between the first component 102 and the second component 104. The locking structures have a peak-to-peak spacing $\lambda$ that is selected to provide a desired interlocking configuration. In the example illustrated in FIGS. 1-3, the peak-to-peak spacing is constant across the interface surface 108. The peak-to-peak spacing and the height of the locking structures are generally sized to provide desired strength and surface area for a desired component size and those dimensions can range from nanometer to centimeter sizes. In some embodiments, the locking structure dimensions can range from 100 nm to 30 cm. In some examples, the spacing $\lambda$ is in a range of about 5 mm to about 20 mm. In some examples, the locking structures have a height H in a range of 1 mm to about 20 mm. The configuration of the locking structures can be selected to alter the failure strength and failure mode of the components and of the joint configuration. For example, the tapered side walls can be configured to apply a desired amount of tensile stress and shear stress to the interface material. Additionally, the locking structures can be figured to have many different configurations, including tapered, undercut, square, rectangular, arcuate or combinations thereof.

The spacing between the first component 102 and the second component 104 can be controlled to provide a desired joint strength. The spacing between the first component and the second component can be controlled to provide desired dimensions of the interface 106, such as thickness T, and/or so that the interface material can flow into the space between the components. In at least some examples, the spacing is selected so that the interface material can be wicked, or drawn, into the space by capillary action. The spacing between the first component and the second component can be controlled during formation of the joint by using spacers that can be incorporated into one, or both, of the first and second components, by using fixturing to maintain the relative position of the first component and second component, and/or by inserting a shim material between the first component and the second component.

The joinery configuration can be used to overcome the shortcomings of other techniques for joining components, especially when at least one component is constructed from materials having different hardness, and when at least one of the materials is brittle. In at least some embodiments, the first component 102 is constructed from a first material, and the second component 104 is constructed from a second material that is different from the first material. In some embodiments, one of the first material and the second material is more brittle than the other material. In some example embodiments, the first material is a ceramic, and the second material is a metal. In some example embodiments, the first material is a ceramic, and the second material is a ceramic. In still further example embodiments, the first material is a metal, and the second material is a metal, and one of the metals is more brittle than the other.

The body material can be selected from a variety of ceramics, metals, metal alloys, and composite materials. Each component can be constructed from metal, metal alloy, carbon fiber composite, ceramic (e.g., an ultra-high temperature ceramic), ceramic-metal composite, or engineering polymers. Exemplary metallic materials that can be used to construct the components include steel, titanium, aluminum, nickel alloys, superalloys (e.g., Hastelloy, Inconel, etc.), and refractory metals (e.g., tungsten, niobium, molybdenum, etc.). In various examples, an ultra-high temperature ceramic is selected so that the body can withstand temperatures exceeding 2000° C. Examples of ceramic materials that can be used include, but are not limited to, various borides, carbides, nitrides, and oxides. Examples of suitable borides include zirconium diboride, hafnium diboride, titanium boride. Examples of suitable carbides include boron carbide, silicon carbide, tungsten carbide, zirconium carbide, hafnium carbide. Examples of suitable nitrides include silicon nitride, aluminum nitride, boron nitride. Examples of suitable oxides include alumina, yttria, zirconia, mullite. In some embodiments, a first component is constructed from a ceramic material is selected from boron carbide ($B_4C$), zirconium diboride ($ZrB_2$), Zirconium carbide (ZrC), hafnium carbide (HfC), and hafnium diboride ($HfB_2$), and a second component is constructed from a metallic material.

The interface 106 is interposed between the interface surface 108 of the first component 102 and the interface surface 112 of the second component 104. The interface 106 is formed from an interface material that is selected to be compliant and to conform to the space formed between the interface surface 108 and the interface surface 112 when the first component 102 is coupled with the second component 104. The interface material is a compliant phase that is interposed between the first component 102 and the second component 104. The interface material combines with the locking structures 110 of the first component 102 and locking structures 114 of the second component 104 to join the components together.

The interface material can be selected to provide shock absorption, improve the chemical bond between the first component 102 and the second component 104, and/or to introduce functionality at the interface between the first component 102 and the second component 104. The interface 106 can be formed from a single material or a plurality of materials. In examples including a plurality of materials, the materials can be configured in layers or as mixtures of the plurality of materials. For example, one or more metals, polymers, glass, or ceramic can be used. In an embodiment, another ceramic phase with lower stiffness than the adjacent component can be used as an interface material. In some embodiments, the interface material is a glass selected from silica, borosilicate glass, soda-lime glass, bulk metallic glass (e.g., Pd-based and Zr-based compositions), and isinglass. In some embodiments, the interface material is a high-temperature polymer selected from polystyrene, polyimide, phenol formaldehyde, and polyurethane. In some embodiments, the interface material is formed from gold and/or silver. In some embodiments, the material chosen for the interface 106 is selected based at least in part on the temperatures the structure is designed to withstand during use.

The interface 106 can be configured to provide sensor capabilities to the structure. In at least one example, the interface material can be configured to output luminescence when stress is applied. In other examples, the interface material can include a piezoelectric material, such as piezoelectric polyvinylidene fluoride (PVDF), which can be configured to output a current or voltage when the interface 106 is subjected to stress. As a further example, a metallic interface material can be utilized for interface 106 and resistance or conductivity of the interface 106 can be monitored, such as by using a voltmeter, to determine changes in the structure of the interface 106. In still further examples, the capacitance of the interface 106 can be monitored.

Various manufacturing techniques can be used to form the first component 102 and the second component 104. For example, the components can be formed by machining, casting, printing, other additive manufacturing techniques, and combinations thereof.

After the first and second components are constructed, they can be held in a fixed relationship so that the interface material can be applied between them to form the interface 106. The interface material can be interposed between the first component 102 and the second component using a variety of techniques. For example, the interface material can be incorporated using techniques such as pressure-less sintering and molten metal infiltration to form the final composite joint. it should be appreciated that the thickness of the interface 106 can be constant or it can vary. For example, the interface 106 can be tuned to provide a selected first thickness at locations that are primarily subjected to shear stress and to provide a selected second thickness at locations that are primarily subjected to tensile stress.

The interlocking shape of the interface surfaces 108, 112 and the resulting interface 106 can be used to increase the surface area of contact between the interface material and the first component 102, and between the interface material and the second component 104. Another advantage of the interlocking shape of the interface surfaces 108, 112 is that they can be used tune the components of tensile stress and shear stress placed on interface 106. The interlocking shape can be used to provide a mechanical lock between the components.

Combinations of materials used in the joinery system can include ceramic/interface/ceramic and metal/interface/ceramic configurations. For example, the joinery system can be constructed from zirconium diboride components with gold as the interface material, zirconium diboride components with silver as the interface material, boron carbide components with gold as the interface material, boron carbide components with silver as the interface material, silicon carbide components with gold as the interface material, silicon carbide components with silver as the interface material. In another example, the joinery system can be constructed from an Inconel component and a silicon carbide component with silica as the interface material.

Figures 4, 5:
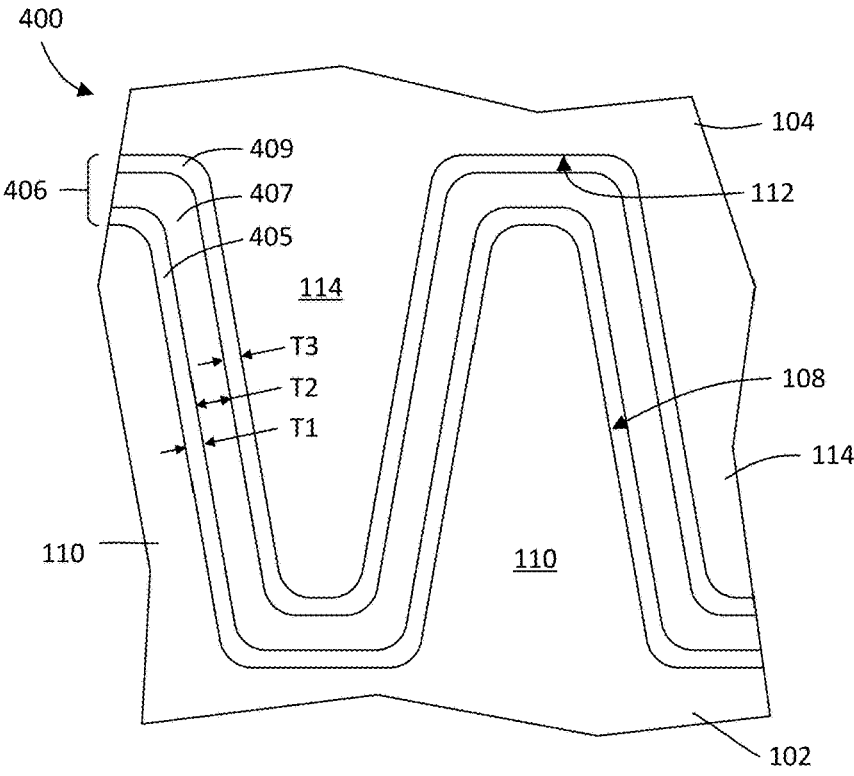
FIG. 4 is a top view of a portion of a joint configuration in accordance with an embodiment.
FIG. 5 is a top view of a portion of a joint configuration in accordance with an embodiment.

Referring to FIG. 4, additional examples of a joint 400 can be constructed with an interface 406 that is constructed as a composite structure that includes a plurality of interface materials formed as layers. The joinery configuration of joint 400 is generally formed by a first component 102, a second component 104, and an interface 406. The first component 102 and the second component 104 can be constructed as previously described.

The interface 406 is a composite structure that is formed from a plurality of materials with each material being configured in a layer. In particular, interface 406 is constructed from a first interface layer 405, a second interface layer 407, and a third interface layer 409. The first layer 405 can be constructed from a first material having a thickness T1, the second layer 407 can be constructed from a second material having a thickness T2, and the third layer 409 can be constructed from a third material having a thickness T3. In an example, the first and third materials are the same and the second material is different. In another example, the first, second, and third materials are all different from each other. It should further be appreciated that each layer can be constructed from a mixture of materials and the mixture can be constructed to include a gradient of materials. It should be further appreciated that the layers can be continuous in which they extend over the entire interface 406, or discontinuous in which they extend over only portions of the interface 406.

The interface 406 can be configured to impart sensor capabilities into the joinery by configuring the interface 406 to generate an output signal. For example, the interface 406 can be configured to provide an optical output, such as by including a material that provides luminescence when stress is applied can be incorporated into the interface. In other examples, the interface can be configured to generate an output signal, such as an output current or voltage, such as by including a piezoelectric material in the interface. In additional examples, a metallic interface material can be utilized and a resistivity or continuity can be measured, such as by using a voltmeter, to provide an output signal to indicate the condition of the interface and the joint. The output signal can be used for inspection to determine the integrity of the joint and/or during use to provide information about the health of the joint.

In an example embodiment, a piezoelectric interface formed from multiple layers is constructed. The piezoelectric interface can be constructed using a sheet of piezoelectric material, e.g., as the second interface material 407, placed between the first component 102 and the second component 104. Then a polymer can be used to encapsulate the piezoelectric material, e.g., as first interface material 405 and third interface material 409, thereby forming a multilayer interface 406.

Referring now to FIG. 5, additional examples of a joint 500 can be constructed with an interface 506 that is constructed as a mixture of materials. The joinery configuration of joint 500 is generally formed by a first component 102, a second component 104, and an interface 506. The first component 102 and the second component can be constructed as previously described. The interface 506 is formed from a mixture of materials that can be configured to provide functionality to the joint 500. For example, the interface material can be a mixture of a plurality of materials, such as a first material 505, a second material 507, and a third material 509. The plurality of materials can be continuous phases and/or dispersed phases or particles mixed into continuous phases.

The mixture can have concentration gradient or the mixture can have a consistent concentration of components over the entire interface 506. In the illustrated example, the interface 506 includes a portion 506*a* that includes an interface material with a concentration gradient of the components.

Similar to other embodiments, the interface 506 can be configured to impart sensor capabilities into the joinery by configuring the interface 506 to generate an output signal. For example, the interface 506 can be configured to provide an optical or electrical output. In some embodiments, the interface 506 is configured to generate an output signal corresponding to stress applied to the interface 506. For example, a material that exhibits triboluminescence can be included, such as copper-doped zinc sulfide. In additional embodiments, the interface can be configured so that resistivity or continuity can be measured, such as by using a voltmeter, to provide an output signal to indicate the condition of the interface and the joint.

Figure 6:
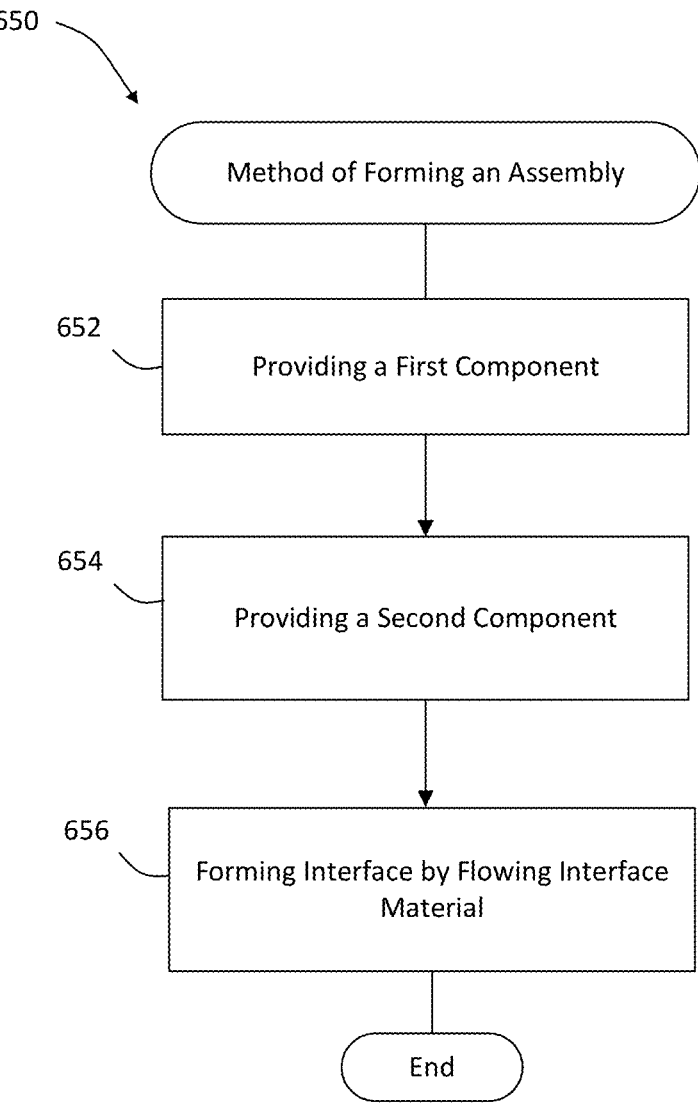
FIG. 6 is a flowchart showing a method of joining components in accordance with an embodiment.

FIG. 6 depicts a flowchart 650 of an example method of making an assembly including a joint configuration according to an embodiment. The method of flowchart 650 can be used to construct an assembly including a joint configuration such as the joint configurations described herein with reference to FIGS. 1-3, and 7-12. Further compositional, structural, and operational embodiments will be apparent to persons skilled in the relevant art(s) based on the discussion regarding flowchart 650.

As shown in FIG. 6, the method of flowchart 650 begins at step 652. In step 652 a first component is provided. The first component is constructed from a first material and is configured to include a contoured interface surface. In some embodiments, the contoured interface surface is formed by a plurality of locking structures that form peaks and valleys of the interface surface. The first component can be constructed using a variety of technique such as machining, casting, printing, other additive manufacturing techniques, and combinations thereof. As an example, the first component can be constructed as shown by first component 102 shown in FIGS. 1-3.

At step 654, a second component is provided. The second component is constructed from a second material and is configured to include a contoured interface surface. The second material can be different than the first material of the first component provided in step 652. The contoured interface surface of the second component is configured to complement and interlock with the contoured interface surface of the first component. The contoured interface surface is generally formed by a plurality of locking structures that form peaks and valleys of the interface surface. The second component can be constructed using a variety of technique such as machining, casting, printing, other additive manufacturing techniques, and combinations thereof. As an example, the second component can be constructed as shown by second component 104 shown in FIGS. 1-3.

In some embodiments, the first component and the second component can be constructed during a multi-material additive manufacturing process, such as direct ink writing. In an example, a first material is used to form the first component and a second material is used to form the second component in the same operation. The second component can be formed in spaced relation to the first component such as by including bridges or studs extending between the components. The bridges or studs can be configured to provide a desired gap for infiltrating the interface material.

Different processes can also be utilized to provide the first component and the second component. In an embodiment, the first component is constructing using additive manufacturing, such as direct ink writing. A mold for the second component can be made based on the printed first component, and the second component cast, such as by gel-casting. After both the first and second components are constructed, the interface material can be infiltrated between the first component and the second component.

At step 656, an interface is formed between the first component and the second component. The first component and the second component are engaged so that the interface surface of the first component is engaged with the interface surface of the second component. A gap is maintained between the interface surfaces to allow for introduction of the interface material therebetween. In some embodiments, the interface material is wicked into the space between the first component and the second component by capillary action. The interface can be formed by using infiltration of a metallic interface material in a liquid state, such as by capillary action. In additional embodiments, the interface can be constructed using additive manufacturing, such as direct metal writing.

It should be appreciated that in some embodiments, the components and the interface can be constructed by additive manufacturing. For example, a multi-material printing process can be utilized to construct the first component, the interface, and the second component in a single operation.

Figure 7:
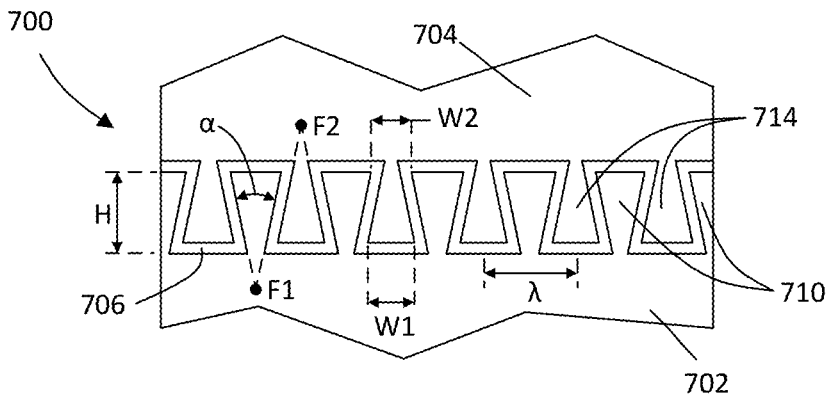
FIG. 7 is a top view of a joint configuration in accordance with an embodiment.

Referring to FIG. 7, an example of an assembly including a joint configuration that includes a dovetail configuration will be described. Joint 700 includes a configuration in which the locking features include an undercut configuration. Joint 700 couples a first component 702 with a second component 704 using an interface 706. The first component 702 includes a plurality of locking structures 710 and the second component 704 includes a plurality of locking structures 714 that complement the locking structures 710 of the first component so that they are configured to interlock. In the example embodiment, the locking structures 710, 712 are formed as trapezoidal projections but tapered larger away from the component to form dovetail structures having tapered side walls. The dovetail structure is formed by a locking structure having an end width W1 that is greater than an opening width W2 of a corresponding recess in the other component. In example embodiments in which the locking structures are configured to be undercut, the locking structures can be interlocked using sliding and/or rotating motion.

The tapered side walls are generally formed to have an internal angle α defined by axes tangent to opposite side walls. In the example illustrated in FIG. 7, the locking structures are configured so that those axes converge to a focal point F that is located within the respective component, i.e., focal point F1 is located within the first component 702 and focal point F2 is located within the second component 704. The internal angle α can be in a range between about 10° and about 170°. In at least some embodiments, the internal angle α is in a range between about 10° and about 40°. In at least some embodiments, the internal angle α is in a range between about 10° and about 30°. In at least one embodiment, the internal angle α is about 22.6° and the locking structures are trapezoidal. In another embodiment, the internal angle α is about 11.3° and the locking structures are trapezoidal. In other examples, the locking structures can have an undercut configuration in which the focal point can be positioned within the respective component as will be described in greater detail below. In another embodiment, the internal angle α is about 11.3° and the locking structures are trapezoidal and have an undercut configuration.

An interface 706 is disposed between the first component 702 and the second component 704. Interface 706 is formed from at least one interface material that is made up of at least one compliant phase. The interface material is interposed between the first component 702 and the second component 704 and surrounds the locking structures 710 of the first component 702 and the locking structures 714 of the second component 704. The interface 706 spaces the first component 702 from the second component 704 while the locking structures remain interlocked. It should be appreciated that the locking structures can be formed as elongate structures and/or discrete projections. For example, the locking structures shown in FIG. 7 can be elongate dovetail ridges and/or discrete dovetail projections.

Similar to other embodiments, the interface 706 can be configured to impart sensor capabilities into the joinery by configuring the interface 706 to generate an output signal. For example, the interface 706 can be configured to provide an optical or electrical output. In some embodiments, the interface 706 is configured to generate an output signal corresponding to stress applied to the interface 706. In additional embodiments, the interface can be configured so that resistivity or continuity can be measured, such as by using a voltmeter, to provide an output signal to indicate the condition of the interface and the joint.

Figure 8:
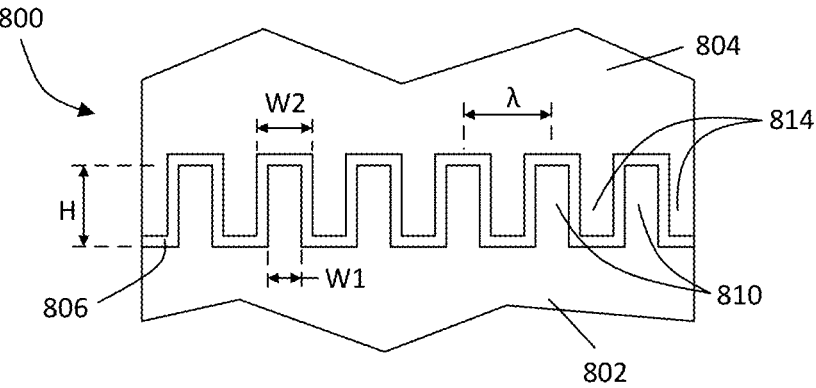
FIG. 8 is a top view of a joint configuration in accordance with an embodiment.

Referring to FIG. 8, another embodiment of an assembly including a joint configuration that includes a stepped configuration will be described. Joint 800 couples a first component 802 with a second component 804 using an interface 806. The first component 802 includes a plurality of locking structures 810 and the second component 804 includes a plurality of locking structures 814 that complement the locking structures 810 of the first component so that they are configured to interlock. In the example embodiment, the locking structures 810, 814 are formed in a stepped configuration. For example, each locking structure has a constant width W1 over the entire height H of the respective locking structure the spacing between adjacent locking structures is configured to have a width W2 that generally corresponds to a sum of the width W1 of a corresponding locking structure and two times the selected thickness of interface 806. In example embodiments in which the locking structures are configured to be undercut, the locking structures can be interlocked using sliding and/or rotating motion.

Figure 9:
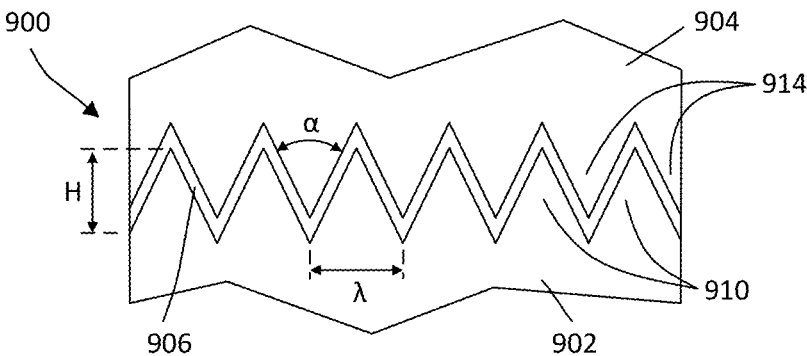
FIG. 9 is a top view of a joint configuration in accordance with an embodiment.

Referring to FIG. 9, another embodiment of an assembly including a joint configuration that includes a saw-tooth configuration will be described. Joint 900 couples a first component 902 with a second component 904 using an interface 906. The first component 902 includes a plurality of locking structures 910 and the second component 904 includes a plurality of locking structures 914 that complement the locking structures 910 of the first component so that they are configured to interlock.

In the example embodiment, the locking structures 910, 914 are formed in a saw-tooth configuration, and each locking structure 910, 914 has a triangular shape in plan view. It should be appreciated that the triangular shape can be symmetric or asymmetric, directional teeth.

Figure 10:
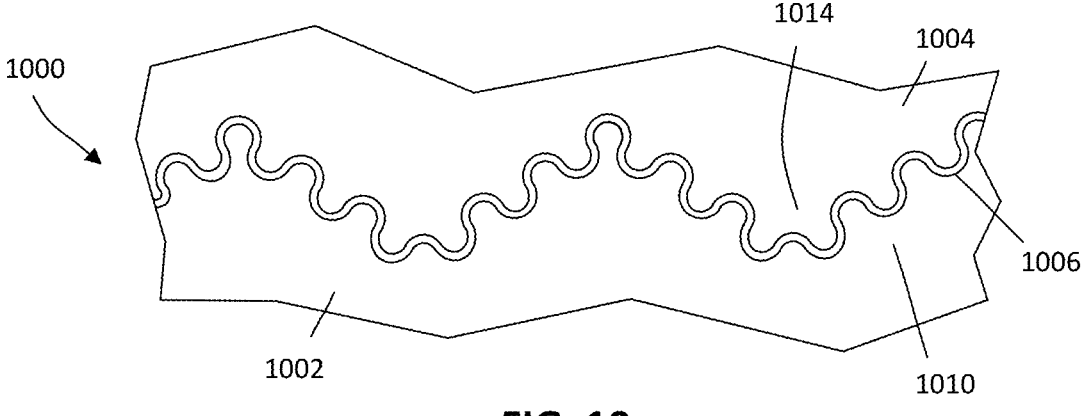
FIG. 10 is a top view of a joint configuration in accordance with an embodiment.

The interface surfaces formed on each of the first component and the second component can be formed with complex configurations. Examples of configurations having more complex configurations will be described with regard to FIGS. 10-12. Referring first to FIG. 10, a joint 1000 can be configured to have a complex curvature. For example, joint 1000 is constructed from a first component 1002, a second component 1004, and an interface 1006. The first component 1002 includes a plurality of locking structures 1010, and the second component includes a plurality of locking structures 1014. The locking structures 1010, 1014 can be configured to each provide an undulating or wavy interface surface of the respective component. The undulating surfaces of the components are configured to be complementary so that the locking structures 1010, 1014 can be interlocked when the first component 1002 is joined with the second component 1004 by interface 1006. In the illustrated example, the undulating interface is configured with a hierarchy of curvatures with more than one order of curvature, such as by including a surface shaped with two orders of magnitude of a sine wave forming the interface surfaces, as shown in FIGS. 10 and 12. It should be appreciated that any number of orders of curvature can be used to form an undulating interface.

Figure 11:
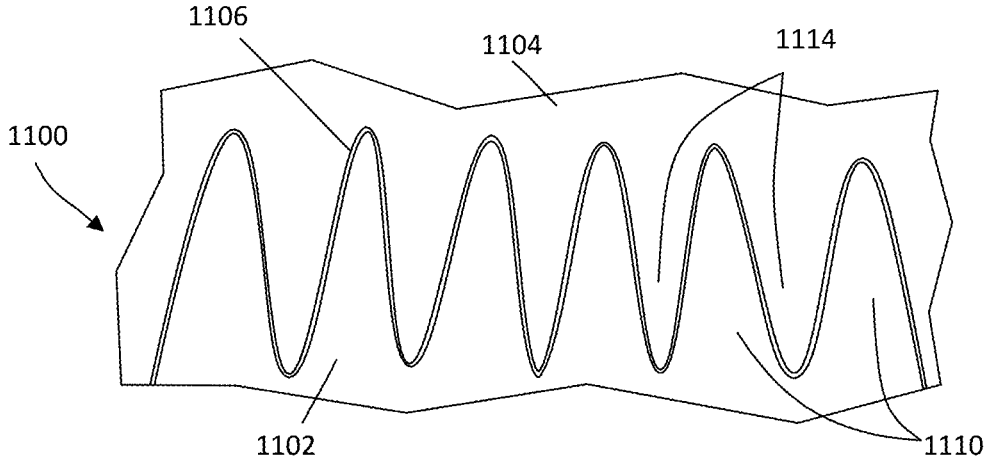
FIG. 11 is a top view of a joint configuration in accordance with an embodiment.
Figure 12:
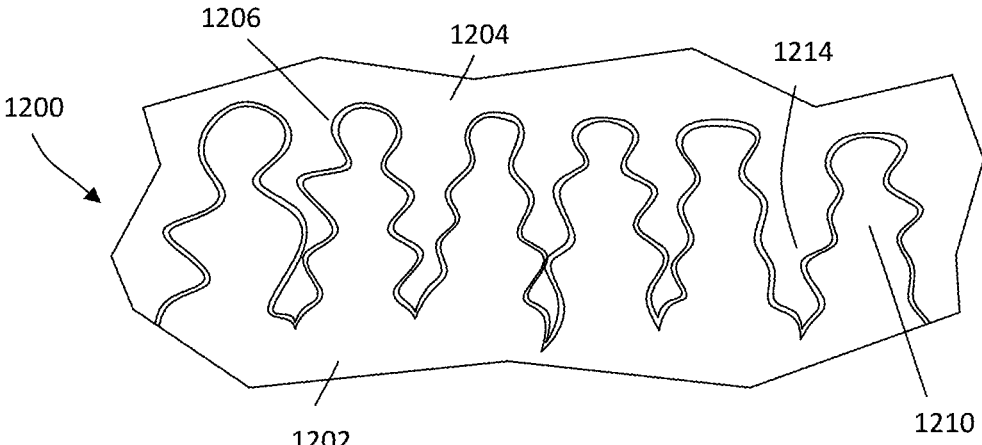
FIG. 12 is a top view of a joint configuration in accordance with an embodiment.

In another example, shown in FIG. 11, a joint 1100 can be configured to have a complex curvature. For example, joint 1000 is constructed from a first component 1002, a second component 1004, and an interface 1006. The first component 1002 includes a plurality of locking structures 1010, and the second component includes a plurality of locking structures 1014. The locking structures 1010, 1014 can be configured to each provide an undulating interface surface of the respective component. The undulating surfaces of the components are configured to be complementary so that the locking structures 1010, 1014 can be interlocked when the first component 1002 is joined with the second component 1004 by interface 1006.

In another example, shown n FIG. 11, a joint 1100 can be configured to have a complex curvature. For example, joint 1000 is constructed from a first component 1002, a second component 1004, and an interface 1006. The first component 1002 includes a of locking structures 1010, and the second component includes a plurality of locking structures 1014. The locking structures 1010, 1014 can be configured to each provide an undulating interface surface of the respective component. The undulating surfaces of the components are configured to be complementary so that the locking structures 1010, 1014 can be interlocked when the first component 1002 is joined with the second component 1004 by interface 1006.

Additional embodiments of the interfaces shown in the embodiments of FIGS. 7-12, i.e., interfaces 706, 806, 906, 1006, 1106, and 1206, are configured to impart sensor capabilities into the joinery by configuring the interface to generate an output signal. For example, the interface can be configured to provide an optical or electrical output. In some embodiments, the interface is configured to generate an output signal corresponding to stress applied to the interface. In additional embodiments, the interface can be configured so that resistivity or continuity can be measured, such as by using a voltmeter, to provide an output signal to indicate the condition of the interface and the joint.

Figure 13:
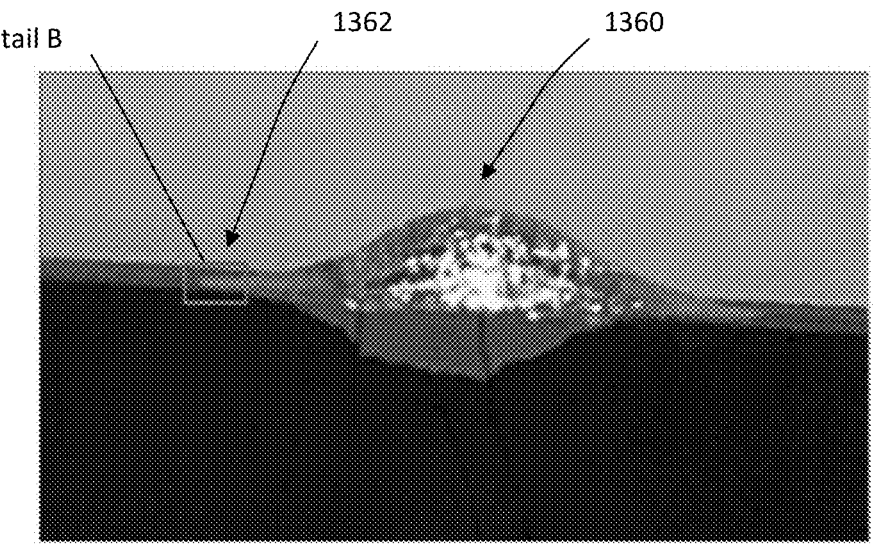
FIG. 13 is a side view showing wetting of an interface material in accordance with an embodiment.
Figure 14:
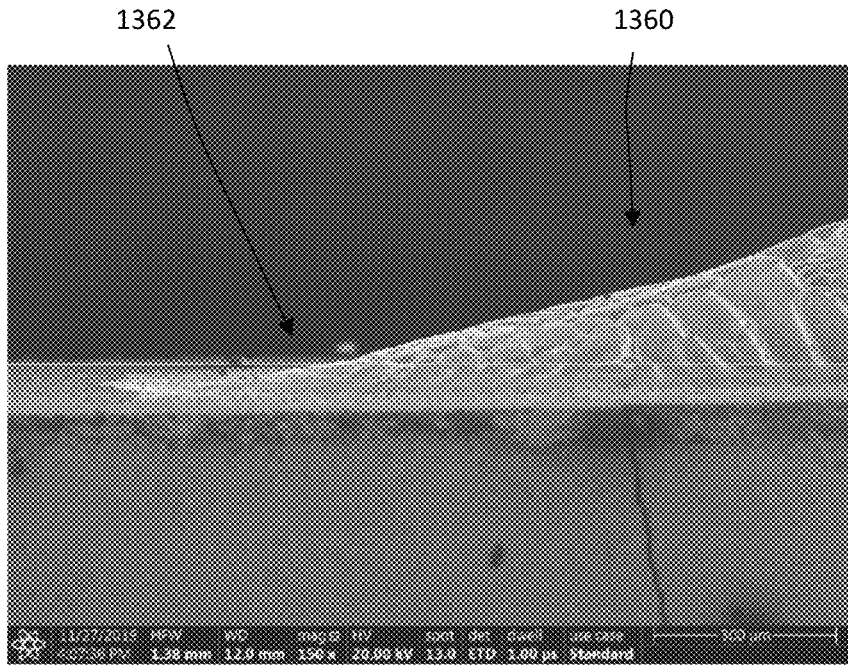
FIG. 14 is a side view of a portion of the interface material, corresponding to Detail B of FIG. 13.

Referring to FIGS. 13 and 14 an interface material 1360 is shown exhibiting wetting characteristics at the perimeter 1362. Those wetting characteristics can be used in conjunction with the design of the first component and second component to provide adequate wicking for interposing the interface material between the first and second components to form the interface. The images show an interface material sample tested for wetting angle so that the information could be used to simulate the geometry necessary between first and second components that would allow the interface material to infiltrate a space between the components.

Figure 15:
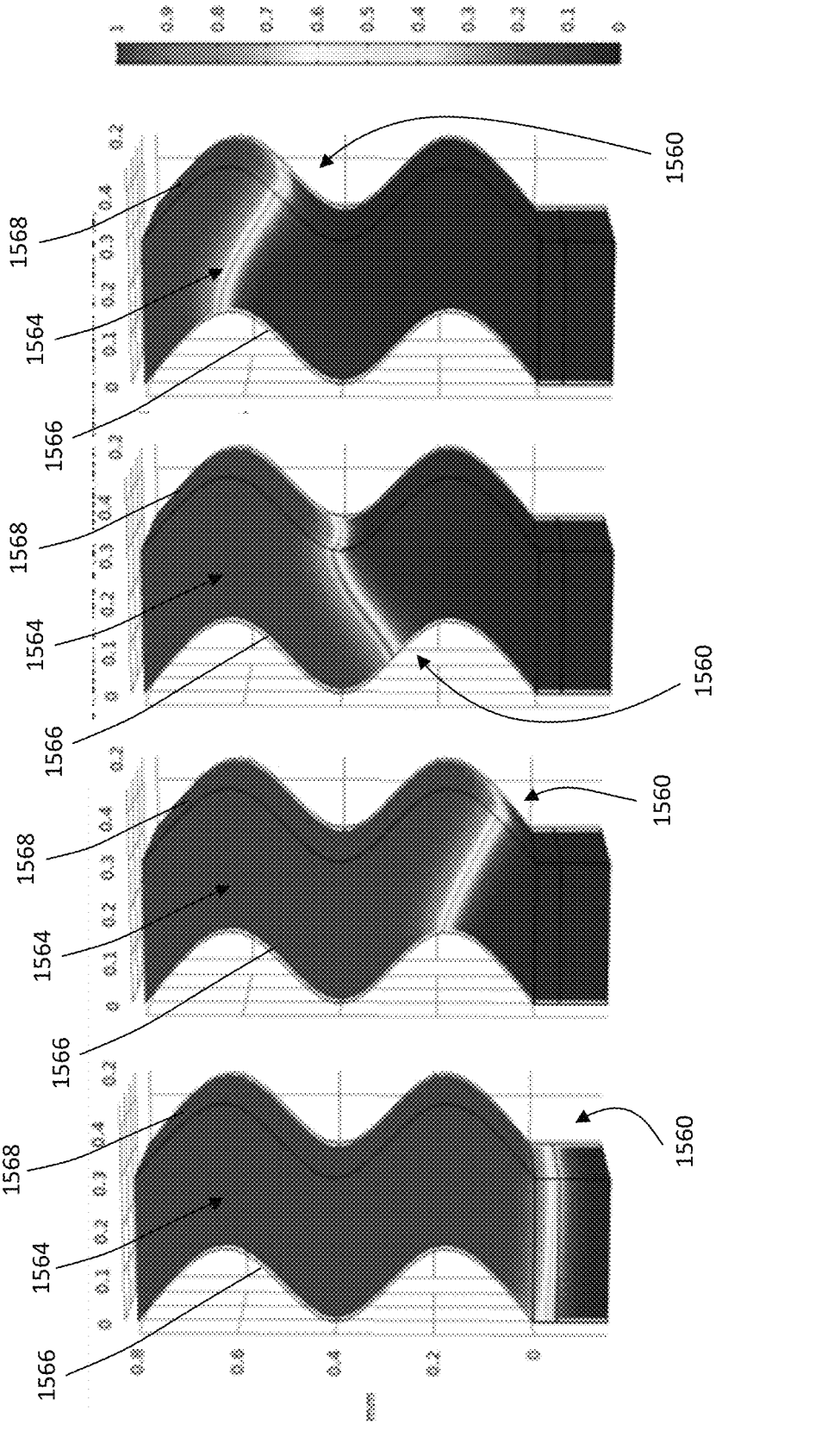
FIG. 15 is a schematic illustrating capillary action of an interface material in a capillary formed between components.

Referring to FIG. 15, schematic representations of a simulation of wicking behavior of a compliant interface material 1560 are shown. In particular, the schematics illustrate the ability of an exemplary interface material 1560 to wick into a gap 1564 provided between adjacent components that are provided with complementary undulating interface surfaces 1566, 1568 and a spacing of approximately 0.3 mm. The illustrated schematics correspond to a simulation of the wicking behavior of an embodiment in which the adjacent components were constructed of zirconium diboride, and the interface material was gold, but other materials can be used. In schematic (a) the interface material is exposed to the space between the components. In schematic (b)-(d), the progression of the interface material wicking into the space is illustrated during the formation of an interface between the two components.

The method of joinery and joinery configurations described herein can be applied in many different fields including aerospace and energy production. In an example, the joinery configuration can be utilized to couple a high temperature body, such as a leading edge or nose cone, to a vehicle body. In other examples, the joinery configuration can be utilized to couple heat shield material to another structure, such as in a nuclear power reactor, or to couple a high-temperature liner to a vessel. Additionally, the joinery configurations can be used to create metamaterials with unique optical, thermal, and mechanical properties. For example, the joinery configurations can be used to create an optically transparent material that has improved structural integrity, such as in high-temperature environments and such embodiments can be used as a lens or window for a sensor.

The inventive concepts disclosed herein have been presented by way of example to illustrate the myriad features thereof in a plurality of illustrative scenarios, aspects, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

III. Further Discussion of Some Example Implementations

This writing presents at least the following implementations:

As a first implementation presented is a method, comprising:

provides a first component, wherein the first component defines a first interface surface formed with peaks and valleys;

providing a second component, wherein the second component defines a second interface surface that is configured to complement the first interface surface; and forming a compliant interface from an interface material interposed between the first interface surface of the first component and the second interface surface of the second component.

A further implementation of any of the preceding or following implementations involves to the extent not incompatible: a method wherein the compliant interface is configured to provide at least one of an optical and electrical output in response to stress applied to the compliant interface.

A further implementation of any of the preceding or following implementations involves to the extent not incompatible: a method wherein the compliant interface comprises a triboluminescent material.

A further implementation of any of the preceding or following implementations involves to the extent not incompatible: a method wherein the compliant interface comprises a piezoelectric material.

A further implementation of any of the preceding or following implementations involves to the extent not incompatible: a method wherein the compliant interface comprises a plurality of layers.

A further implementation of any of the preceding or following implementations involves to the extent not incompatible: a method wherein the first interface surface and the second interface surface are undulating surfaces configured with a hierarchy of curvatures with more than one order of curvature.

A further implementation of any of the preceding or following implementations involves to the extent not incompatible: a method wherein at least one of the first component and the second component is constructed from a ceramic material.

A further implementation of any of the preceding or following implementations involves to the extent not incompatible: a method wherein the ceramic material is selected from the group consisting of zirconium diboride, boron carbide, and silicon carbide, and wherein the interface material comprises at least one of silver and gold.

A further implementation of any of the preceding or following implementations involves to the extent not incompatible: a method wherein at least one of the first component and the second component is constructed using an additive manufacturing technique.

A further implementation of any of the preceding or following implementations involves to the extent not incompatible: a method wherein the step of forming the compliant interface comprises wicking an interface material into a space between the first component and the second component using capillary action.

A further implementation of any of the preceding or following implementations involves to the extent not incompatible: a method wherein interface material comprises a metal.

A further implementation of any of the preceding or following implementations involves to the extent not incompatible: a method wherein the interface material comprises a polymer.

A further implementation involves a method comprising:

providing a first component constructed from a ceramic material, wherein the first component defines a first interface surface formed with peaks and valleys;

providing a second component, wherein the second component defines a second interface surface formed with peaks and valleys that are configured to complement and interlock with the peaks and valleys of the first interface surface; and forming a compliant interface from an interface material interposed between the first interface surface of the first component and the second interface surface of the second component, wherein the compliant interface is configured to provide at least one of an optical and electrical output in response to stress applied to the compliant interface.

A further implementation of any of the preceding or following implementations involves to the extent not incompatible: a method wherein the compliant interface comprises a triboluminescent material.

A further implementation of any of the preceding or following implementations involves to the extent not incompatible: a method wherein the compliant interface comprises a piezoelectric material.

A further implementation of any of the preceding or following implementations involves to the extent not incompatible: a method wherein the first interface surface and the second interface surface are undulating surfaces configured with a hierarchy of curvatures with more than one order of curvature.

A further implementation of any of the preceding or following implementations involves to the extent not incompatible: a method wherein the ceramic material is selected from the group consisting of zirconium diboride, boron carbide, and silicon carbide, and wherein the interface material comprises at least one of silver and gold.

A further implementation of any of the preceding or following implementations involves to the extent not incompatible: a method wherein the step of forming the compliant interface comprises wicking an interface material into a space between the first component and the second component using capillary action.

A further implementation involves an assembly comprising:

a first component including a first interface surface defined by a plurality of first locking structures that form peaks and valleys, wherein the first component is constructed of a first material;

a second component including a second interface surface defined by a plurality of second locking structures that form peaks and valleys, wherein the second component is constructed of a second material, wherein the second locking structures complement and interlock with the first locking structures, and wherein one of the first material and the second material is more brittle than the other of the first material and the second material; and an interface interposed between the first interface surface of the first component and the second interface surface of the second component, wherein the interface is constructed of an interface material, wherein the interface material has a stiffness lower than a stiffness of the first material and a stiffness of the second material.

A further implementation of any of the preceding or following implementations involves to the extent not incompatible: an assembly wherein the interface material comprises at least one of a triboluminescent material and a piezoelectric material.

What is claimed is:

1. A method of joining components via chemical bonding, the method comprising:

providing a first component, wherein the first component defines a first interface surface formed with peaks and valleys;

providing a second component, wherein the second component defines a second interface surface that is configured to complement the first interface surface; and forming a compliant interface from an interface material interposed between the first interface surface of the first component and the second interface surface of the second component thereby creating a joint, the interface material comprising a chemical bonding material.

2. The method of claim 1, wherein the compliant interface is configured to provide at least one output selected from the group consisting of: an optical output and an electrical output in response to stress applied to the compliant interface.

3. A method of joining components, comprising:

providing a first component, wherein the first component defines a first interface surface formed with peaks and valleys;

providing a second component, wherein the second component defines a second interface surface that is configured to complement the first interface surface; and forming a compliant interface from an interface material interposed between the first interface surface of the first component and the second interface surface of the second component, wherein the compliant interface comprises a triboluminescent material.

4. The method of claim 2, wherein the compliant interface comprises a piezoelectric material and is configured to output a current and/or voltage when the compliant interface is subjected to stress.

5. The method of claim 1, wherein the compliant interface comprises a plurality of layers.

6. The method of claim 1, wherein the first interface surface and the second interface surface are undulating surfaces configured with a hierarchy of curvatures with more than one order of curvature.

7. The method of claim 1, wherein the first component is constructed from a ceramic material.

8. The method of claim 7, wherein the ceramic material is selected from the group consisting of zirconium diboride, boron carbide, and silicon carbide, and wherein the interface material comprises at least one material selected from the group consisting of: silver and gold.

9. The method of claim 1, wherein at least one of the components is constructed using an additive manufacturing technique.

10. The method of claim 1, wherein the step of forming the compliant interface comprises wicking the interface material into a space between the first component and the second component using capillary action.

11. The method of claim 1, wherein interface material comprises a metal.

12. The method of claim 1, wherein the interface material comprises a polymer.

13. A method of joining components, comprising:

providing a first component constructed from a ceramic material, wherein the first component defines a first interface surface formed with peaks and valleys;

providing a second component, wherein the second component defines a second interface surface formed with peaks and valleys that are configured to complement and interlock with the peaks and valleys of the first interface surface; and forming a compliant interface from an interface material interposed between the first interface surface of the first component and the second interface surface of the second component, wherein the compliant interface is configured to provide at least one output selected from the group consisting of: an optical output and an electrical output in response to stress applied to the compliant interface.

14. The method of claim 13, wherein the compliant interface comprises a triboluminescent material.

15. The method of claim 13, wherein the compliant interface comprises a piezoelectric material and is configured to output a current and/or voltage when the compliant interface is subjected to stress.

16. The method of claim 13, wherein the first interface surface and the second interface surface are undulating surfaces configured with a hierarchy of curvatures with more than one order of curvature.

17. The method of claim 13, wherein the ceramic material is selected from the group consisting of zirconium diboride, boron carbide, and silicon carbide, and wherein the interface material comprises at least one material selected from the group consisting of: silver and gold.

18. The method of claim 13, wherein the step of forming the compliant interface comprises wicking the interface material into a space between the first component and the second component using capillary action.

19. The method of claim 1, wherein the second component is constructed from a ceramic material.

20. The method of claim 1, wherein the chemical bonding is provided by the compliant interface formed with the interface material, the interface material providing chemical reactivity with the components adjacent thereto.

21. The method of claim 13, wherein chemical bonding is provided by the compliant interface formed with the interface material, the interface material providing chemical reactivity with the components adjacent thereto.

* * * * *